UNITED STATES PATENT OFFICE.

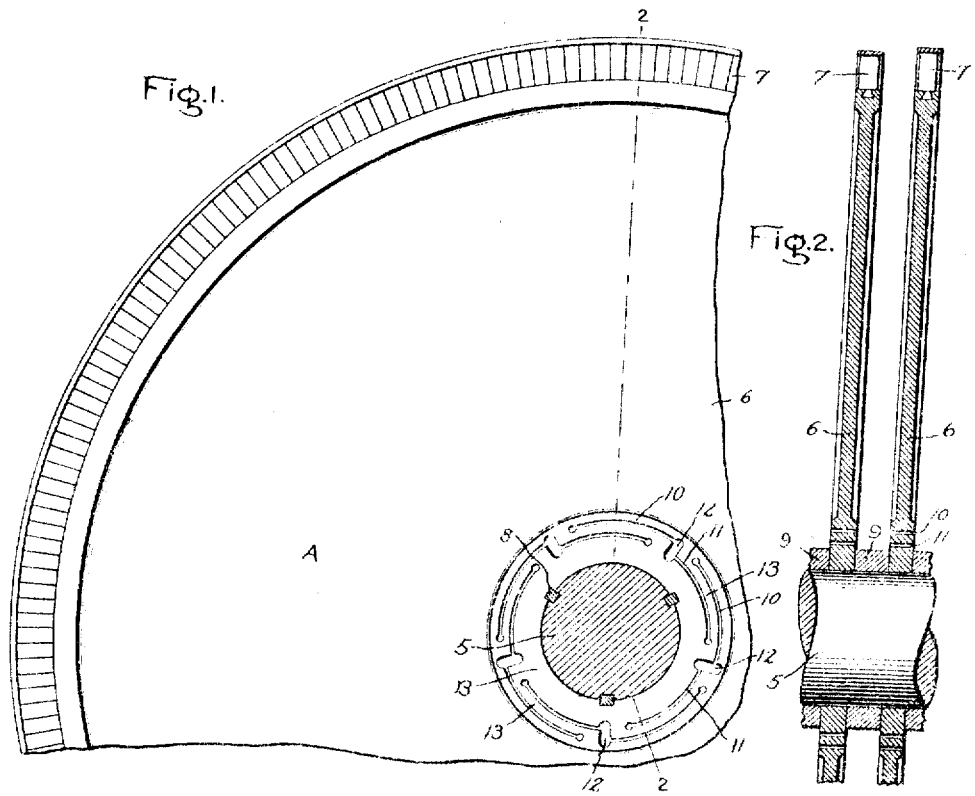

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,267,872.      Specification of Letters Patent.      Patented May 28, 1918.

Application filed April 17, 1917. Serial No. 162,701.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic fluid turbines and particularly of the type comprising a plurality of disks or wheels mounted on a shaft and carrying suitable buckets upon the periphery. With such turbines it is important that the disks or wheels be made as light as possible in order to reduce the weight of the machine thereby reducing its size. In addition, by making the disks or wheels as thin as possible, particularly at the hubs where the greatest stresses occur, the distance between the bearings may be reduced, or a larger number of stages may be put in in the same distance. On the other hand, it is essential to obtain a rigid construction which will withstand not only the stresses set up due to the centrifugal action, but also those which occur due to the substantial temperature changes which are continuously going on in the turbine due to changes in load and variations in the vacuum. If the turbine wheel or disk is rigidly fastened to the shaft, these latter stresses, due to temperature changes, are very large, particularly in the hubs, on account of the wheels or disks responding much more quickly to temperature changes than the heavy shaft, and with this arrangement a relatively heavy wheel having a strong hub is required as otherwise the wheel if made too thin and light will distort and possibly loosen on the shaft.

The primary object of the present invention is to provide an improved structure in which the wheel is flexibly or yieldingly connected to the shaft so it is free to respond to temperature changes independently of the shaft. By this arrangement the strains due to temperature changes are practically eliminated and as a consequence the wheels or disks may be made much lighter and thinner than heretofore.

A further object of the invention is to provide an improved turbine wheel or disk so constructed that it has a certain amount of flexibility so that when mounted on the shaft it may expand and contract under temperature changes without being subjected to any substantial strains.

For a consideration of what I believe to be novel and my invention, attention is directed to the accompanying specification and the claims appended thereto.

In the accompanying drawings, Figure 1 is a side elevation of a portion of a turbine wheel or disk embodying the invention; Fig. 2 is a section taken on lines 2—2, Fig. 1, and Fig. 3 illustrates a second form of the invention.

Referring to the drawing, 5 indicates a shaft and 6 wheels or disks mounted thereon and carrying the usual ring or rings of buckets 7. The wheels 6 in the present instance are shown as being keyed to the shaft as indicated at 8 and spaced apart by rings 9.

In carrying out my invention the wheels 6 are flexibly connected to the shaft by means of bars, strips or links which extend in a direction other than radial and are preferably arcuate and lie in the plane of or in a plane parallel to the wheel. In my preferred construction these bars, strips or links are formed by means of arcuate slots cut through the wheels 6 adjacent the shaft. The slots are arranged on two concentric rings, each slot being arranged to overlap the space between the two adjacent slots. In other words, I provide two concentric rings of overlapping arcuate slots. This leaves the portion of the wheel outside the rings of slots connected to that inside by a ring of short arcuate bars, strips or links.

Referring to Fig. 1, each slot comprises two portions 10 and 11 arranged on different concentric rings and connected at their adjacent ends by a radially extending opening 12. All the portions 10 of the slots are arranged on one ring and all the portions 11 on another ring, the two rings being concentric, and the ends of adjacent slots being spaced apart a suitable distance. By this arrangement it will be seen the outer portion A of the wheel is connected to the inner portion B by arcuate bars, strips or links 13, the same being shown in the present instance as being arranged on a circle concentric with the shaft.

Referring now to Fig. 3, the form of the invention here illustrated differs from that of Figs. 1 and 2 in that each arcuate slot is located entirely on the same ring instead of on two concentric rings. 15 indicates a ring of arcuate slots, arranged concentric with which is a second ring of arcuate slots 16, the slots of each ring being in staggered relation to those of the other, so that each slot of one ring overlaps the space between adjacent slots of the other ring. This provides bars, strips or links 17 which serve to connect the portion of the wheel outside the slots 15 and 16 to the portion inside said slots.

By these arrangements, a perfect flexibility is obtained so that the wheel or disk 6 may expand due to temperature changes independent of the shaft. As will be obvious, the degree of flexibility of the arrangement shown in Figs. 1 and 2 will be greater than that shown in Fig. 3, as the bars, strips or links 13 are longer than the bars, strips or links 17.

Due to the above described arrangements, wheels or disks made much lighter and thinner than heretofore may be used without danger of distortion. At the same time, the necessary strength and rigidity in the wheel or wheels is provided.

Viewed from a broad aspect, it will be apparent that my improved structure embodies in substance a wheel or disk connected to the shaft by bars, strips or links which allow a certain amount of flexibility in a radial direction; and viewed somewhat more specifically it embodies a wheel or disk formed of two concentric parts connected to each other by bars, strips or links which allow of a certain amount of flexibility in a radial direction, and while I have described the invention as embodied in a structure wherein the bars, strips or links are formed integrally with and directly in the wheel or disk, this being the arrangement I now prefer, it will be clear that the parts may be formed separately and suitably connected together.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. In an elastic fluid turbine, the combination of a shaft, a wheel and links connecting the wheel to the shaft forming a flexible connection between them, said links being arranged in a plane at right angles to the shaft.

2. In an elastic fluid turbine, the combination of a shaft, a wheel, and links which extend in other than a radial direction connecting the wheel to the shaft, said links being arranged in a plane at right angles to the shaft.

3. In an elastic fluid turbine, the combination of a shaft, a wheel and arcuate links extending circumferentially of the shaft connecting the wheel to the shaft.

4. In an elastic fluid turbine, the combination of a shaft and a wheel, said wheel being fixed on the shaft, and comprising two annular portions connected together by bars which are located in the plane of the wheel and extend in other than a radial direction.

5. In an elastic fluid turbine, the combination of a shaft and a wheel fastened thereon, said wheel having slots in it adjacent the shaft to give flexibility to the wheel in a radial direction.

6. In an elastic fluid turbine, the combination of a shaft and a wheel fastened thereon, said wheel having overlapping slots in it located adjacent the shaft.

7. In an elastic fluid turbine, the combination of a shaft and a wheel fastened thereon, said wheel having a plurality of rings of overlapping slots in it adjacent the shaft.

8. In an elastic fluid turbine, the combination of a shaft and a wheel fastened thereon, said wheel having a plurality of arcuate overlapping slots arranged in concentric rings, the slots in one ring overlapping the spaces between the slots in the other ring.

9. A turbine wheel for an elastic fluid turbine having adjacent its bore a plurality of slots forming flexible strips which permit the portion of the turbine wheel outside said slots to expand independently of the portion inside said slots.

10. In an elastic fluid turbine, the combination of a shaft, a ring fixed thereon, a bucket wheel adjacent the ring, and bars arranged around the shaft and located in a plane at right angles to the shaft which serve to flexibly connect the wheel to the ring.

11. In an elastic fluid turbine, the combination of a shaft, a ring fixed thereon, a bucket wheel concentric with the ring, and connecting members located in the plane of the wheel for flexibly connecting the wheel to the ring.

In witness whereof, I have hereunto set my hand this 16th day of April, 1917.

OSCAR JUNGGREN.